United States Patent
Walliser et al.

(10) Patent No.: US 10,641,342 B2
(45) Date of Patent: May 5, 2020

(54) RUNNING ROLLER FOR A POD JOINT

(71) Applicant: SCHAEFFLER TECHNOLOGIES AG & CO. KG, Herzogenaurach (DE)

(72) Inventors: Christophe Walliser, Haguenau (FR); Xavier Mehul, Rosheim (FR); Jean-Philippe Dietrich, Wintzenheim (FR)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/071,926

(22) PCT Filed: Feb. 3, 2017

(86) PCT No.: PCT/DE2017/100076
§ 371 (c)(1),
(2) Date: Jul. 23, 2018

(87) PCT Pub. No.: WO2017/133732
PCT Pub. Date: Aug. 10, 2017

(65) Prior Publication Data
US 2019/0032723 A1    Jan. 31, 2019

(30) Foreign Application Priority Data

Feb. 5, 2016   (DE) .................. 10 2016 201 775

(51) Int. Cl.
*F16C 33/46* (2006.01)
*F16D 3/202* (2006.01)
*F16D 3/205* (2006.01)

(52) U.S. Cl.
CPC ............. *F16D 3/202* (2013.01); *F16D 3/205* (2013.01); *F16D 3/2055* (2013.01); *F16D 2003/2026* (2013.01)

(58) Field of Classification Search
CPC ...... F16C 11/02; F16C 33/34; F16C 33/4641; F16C 33/4647; F16C 33/4652;
(Continued)

(56) References Cited

U.S. PATENT DOCUMENTS

| | | |
|---|---|---|
| 2,365,154 A | 12/1944 | Storz |
| 2,503,070 A | 4/1950 | Reiss |

(Continued)

FOREIGN PATENT DOCUMENTS

| | | |
|---|---|---|
| DE | 903154 C | 2/1954 |
| DE | 3309551 A1 | 11/1983 |

(Continued)

OTHER PUBLICATIONS

International Search Report and Written Opinion for Application No. PCT/DE2017/100076, dated May 31, 2017, 7 Pages.

*Primary Examiner* — Phillip A Johnson
(74) *Attorney, Agent, or Firm* — Brooks Kushman P.C.

(57) ABSTRACT

A cam roller for a pod joint, comprising an inner rolling path and an outer ring unit, wherein a rolling path for the rolling on a bell housing section is arranged on an outer side of the outer ring unit, a plurality of rolling elements, wherein the plurality of rolling elements are arranged between the inner rolling path and the outer ring unit, and a cage device, wherein the plurality of rolling elements are arranged within the cage device, wherein the cage device includes at least one separating point in circumferential direction.

19 Claims, 4 Drawing Sheets

(58) Field of Classification Search
CPC ............... F16C 33/4694; F16C 33/546; F16C 2326/41; F16C 33/502; F16C 33/504; F16C 33/513; F16C 33/516; F16D 3/202; F16D 3/205; F16D 3/2055; F16D 2003/2026
USPC .......................................... 384/572, 577, 580
See application file for complete search history.

(56) References Cited

U.S. PATENT DOCUMENTS

| | | | | |
|---|---|---|---|---|
| 3,163,477 | A | * | 12/1964 | Schmidt ................ F16C 19/28 384/577 |
| 3,399,008 | A | * | 8/1968 | Farrell .................... F16C 9/04 384/577 |
| 4,239,304 | A | * | 12/1980 | Wakunami ........... F16C 33/504 384/573 |
| 4,512,750 | A | | 4/1985 | Orain |
| 5,073,144 | A | | 12/1991 | Stenglein et al. |
| 5,505,660 | A | * | 4/1996 | Van Dest ............... F16D 3/065 464/111 |
| 5,525,109 | A | * | 6/1996 | Hofmann .............. F16D 3/2055 464/111 |
| 6,406,190 | B1 | | 6/2002 | Yoon |
| 6,709,163 | B2 | * | 3/2004 | van der Knokke ..... F16C 33/41 384/523 |
| 2013/0272641 | A1 | * | 10/2013 | Hachisuka .......... F16C 33/4694 384/577 |
| 2015/0167738 | A1 | * | 6/2015 | Doki-Thonon ....... F16C 33/467 384/572 |

FOREIGN PATENT DOCUMENTS

| | | |
|---|---|---|
| DE | 19839486 A1 | 3/2000 |
| DE | 4112506 C2 | 5/2000 |
| DE | 102004025531 A1 | 12/2005 |
| DE | 102005054082 A1 | 5/2007 |
| DE | 112008002567 T5 | 10/2010 |
| EP | 1219845 A2 | 7/2002 |
| GB | 2521209 A | 6/2015 |
| JP | 2008064252 A | 3/2008 |
| JP | 2009197920 A | 9/2009 |
| JP | 2013174283 A | 9/2013 |

* cited by examiner

RUNNING ROLLER FOR A POD JOINT

CROSS-REFERENCE TO RELATED APPLICATIONS

This application is the U.S. National Phase of PCT/DE2017/100076 filed Feb. 3, 2017, which claims priority to DE 102016201775.6 filed Feb. 5, 2016, the entire disclosures of which are incorporated by reference herein.

TECHNICAL FIELD

The disclosure relates to a cam roller for a pod joint, comprising an inner ring unit for receiving a pin of a shaft stub section, featuring an outer ring unit, wherein a running path is arranged on the outer side of the outer ring unit so that a rolling is possible on a bell housing section, featuring a plurality of rolling elements, wherein the rolling elements are arranged between the inner ring unit and the outer ring unit, and a cage device, wherein the rolling elements are arranged within the cage device.

BACKGROUND

In the powertrain of motor vehicles, constant velocity joints are often used for the transmitting of the drive torque from a differential device or from another transmission output to a driven, in particular steered wheel, which ensure on the one hand the transmission of the drive torque and on the other hand allow for a changing of the angle between the transmission output and an intermediate shaft. The use of constant velocity joints makes it possible that the driven wheels can deflect or that they can be steered, e.g. due to uneven road surfaces, regardless of the transmission output which is usually attached to the motor vehicle body.

Constant velocity joints are known from the design form of tripod joints. As a first joint partner, such tripod joints feature a shaft end comprising pin sections that are integrally formed thereon which protrude radially away from the shaft ends, onto which rollers are arranged. This first joint partner is inserted in a bell housing as a second joint partner, wherein the rollers can roll on an inner side of the bell housing, with the result that the shaft end pivots relative to the bell housing but can rotate together with the bell housing.

Such a tripod joint is e.g. described in the publication DE 10 2004 025 531 A1, which probably forms the closest prior art. This publication particularly deals with the structure of the roller, wherein it features an inner ring which is arranged on the pin, as well as an outer ring, which can roll with its outer circumference on an inner surface of the bell housing. Needle-shaped rolling elements are arranged between the inner ring and the outer ring, which are guided within a cage.

One kind of a further tripod joint in accordance with this category, in which the inner rolling path is not formed on an inner ring as it was the case in the before-mentioned design form, but rather directly on the surface of the pivot pin, is disclosed in EP1219845A2.

SUMMARY

It is the objective of the present disclosure to simplify the manufacturing of tripod joints. This objective is achieved by a cam roller for a tripod joint as well as by a tripod joint comprising the cam roller. Embodiments of the disclosure can be derived from the following description as well as from the accompanying figures.

The subject-matter of the disclosure is a cam roller, which is suitable and/or designed for a pod joint. In particular the cam roller is designed as a cam roller for a pod joint. The cam roller is particularly designed as a radial bearing, specifically as a radial anti-friction bearing. The cam roller defines a cam roller axis by the rotation axis. A radial anti-friction bearing is formed by rolling elements, in this case by rollers and needles, which are formed by an inner rolling path as well as an outer rolling path on which the rolling elements roll.

The pod joint and/or the cam roller may be arranged within a drive train of a motor vehicle. Optionally, the motor vehicle with the pod joint and/or with the cam roller present a further subject-matter of the disclosure. The pod joint may be arranged within the drive train between a transmission output, in particular a differential gear output, and a driven wheel. The pod joint may be arranged between the transmission output and an intermediate shaft, in particular a cardan shaft, for the transmitting of a driving torque to the driven wheel. The motor vehicle may feature two of the pod joints on one driven axle. The driven axle may be at the same time a steered axle.

The function of the pod joint is to create a joint that can be pivoted and/or adjusted in its angle between the transmission output and the intermediate shaft for the transmitting of the drive torque.

The pod joint may be designed as a constant velocity joint. The pod joint is particularly designed as a bipod joint, tripod joint or as a quattro pod joint.

The pod joint may feature a shaft stub section as a first joint partner with pins that are arranged onto it. The pins may e.g. be integrally connected to the shaft stub section. Alternatively, the pins are formed on a star with a hub, whose "spikes" are formed by the pins. The pin rests with its hub on a shaft or on a shaft stub. The pins may protrude radially out or at least with some angle towards the shaft axis as rotation axis and/or towards the longitudinal direction of the shaft stub section. The pins may be evenly distributed in circumferential direction along the shaft stub section. It is intended that the cam roller is placed on the pin or that it can be placed onto it. A cam roller may be placed onto each one of the pins.

The pod joint further features a bell housing section as a second joint partner, which is often also referred to as tulip. The shaft stub section with the pins and the cam rollers is inserted into the bell housing section, wherein the cam rollers roll on one or several surfaces, in particular inner surfaces of the bell housing section, in order to pivot the shaft stub section in relation to the bell housing section.

In one embodiment, the shaft stub section forms a partial section of the intermediate shaft or it is operatively connected to it and the bell housing section is operatively connected to the transmission output. In an alternative embodiment, the shaft stub section is operatively connected to the transmission output and the bell housing section forms a partial section of the intermediate shaft or it is operatively connected to it.

The inner rolling path is directly formed on a cylindrical pin in the area of the inner rolling path. Alternatively, the cam roller features an inner ring unit, which is formed and/or suitable for receiving a pin. The inner ring unit may be placed onto the pin, in particularly in a non-rotatable and/or non-displaceable manner, in particular in such a way that the pin reaches into the inner ring unit. The inner ring unit can be composed of several individual parts, but it may be made of one single piece and/or from one single material. The inner ring unit may be manufactured as an inner ring made by forming technologies. The inner ring unit particularly comprises an inner rolling path on the radial outer side and on the inner side a contact surface for the contact to the pin.

Cam rollers, whose inner rolling path is directly formed on the surface of the pin require less radial installation space when compared to those with an inner ring. Such rolls furthermore comprise less components due to the missing inner ring. However, by using the cam rollers that comprise an inner ring, it is advantageously possible to create a respective additional flexible connection to the cardan shaft, in particular when the hub of the pin is formed in a spherical manner.

The cam roller further features an outer ring unit, which may be arranged in a coaxial manner with reference to the cam roller axis and/or concentrically with reference to the inner ring unit. The outer ring unit can be composed of several parts, but it may be made of one single piece and/or one single part. The outer ring unit is particularly manufactured as an outer ring made by forming technologies. Alternatively, the outer ring is manufactured from rolling bearing steel in a metal-cutting manner. The outer ring unit comprises an outer rolling path on the radial inner side and on the outer side, in particular on the radial outer side, a rolling path for the rolling and/or gliding on the bell housing section. The rolling path for the rolling on the bell housing section may be designed in a convex, particularly spherical manner in a longitudinal section through the cam roller axis. For a spherical design, the center point of the spherical curvature may lie on the cam roller axis. A difference of the diameter of the rolling path from a largest diameter to a smallest diameter may amount to at least two millimeter, such as at least four millimeter.

The cam roller furthermore features a plurality of rolling elements, wherein the rolling elements are arranged between the inner ring unit and the outer ring unit. The rolling elements between the inner ring unit and the outer ring unit may be arranged in such a way that they roll. The rolling elements may roll or run on the outer rolling path of the inner ring unit and on the inner rolling path of the outer ring unit. The rolling elements are designed as rollers, in particular as cylinder rollers, specifically as needles or needle rollers. In their design as needles or needle rollers, the rolling elements feature a length in axial direction, which is at least two and a half times as large as the diameter of the respective rolling element, whereas the needle rollers feature a comparatively large diameter when compared to needles.

The cam roller further comprises a cage device, wherein the rolling elements are arranged within the cage device. The cage device may be designed in such a way that the rolling elements are set at a distance from in each other in circumferential direction along the cam roller axis.

In line with the disclosure, it is proposed that the cage device features at least one separating point in circumferential direction along the cam roller axis. The cage device is particularly interrupted at the at least one separating point.

It is hereby a consideration of the disclosure, that the assembling of the cage device with the rolling elements between the inner ring unit and the outer ring unit can be difficult due to constructive limiting conditions. But since the cage device comprises at least one separating point, it is possible to mount the cage device divergent from the later geometrical form, in particular divergent from the later diameter of the cage device. It is thus possible to bend the cage device open or close during the assembly, wherein the bending procedure may be designed to be in an elastic manner, in order to simplify the assembling of the cage device in an optimal way with or without the rolling elements between the inner ring unit and the outer ring unit. If there are several separating points, the individual segments of the cage device can be inserted independently from each other, so that the assembling is also simplified when there are several separating points.

In one possible embodiment of the disclosure, the cage device features exactly one separating point. The cage device is e.g. designed as a interrupted ring. This design form features the advantage, that the cage device can be handled in a simple manner during the assembling, similar to a cage that is closed in circumferential direction, but that it can be adapted in its diameter during the assembly by using a bending open or close.

In one alternative embodiment of the disclosure, the cage device is designed as a segment cage and/or features more than one separating point. The cage device is divided in circumferential direction into exactly or at least two segments. It is e.g. possible that the cage device is divided in circumferential direction into two half shells. In modified design forms it is also possible that the cage device features a larger and a smaller segment in circumferential direction. It is thus possible in line with the disclosure, that one segment provides e.g. three fourths and a smaller segment one fourth of the cage device. However, it is also possible that several segments, e.g. three or four segments, form the cage device, which can be stringed together in circumferential direction. The assembling for this embodiment is also simplified, since the segments of the cage device can simply be placed on or snapped onto the inner ring unit.

In one possible embodiment of the disclosure, the cage device is designed as a window cage. The cage device particularly features connecting links for the rolling elements, which run between the rolling elements, as well as axial boundaries, which are e.g. designed as ring sections, so that the rolling elements cannot slide out in axial direction. By utilizing the cage device, an enclosed window that is circulating around the rolling element is particularly formed for at least one rolling element, for some rolling elements, for most of the rolling elements or for all rolling elements. In this embodiment, the rolling elements are held within the cage device in such a way that they cannot fall out.

In another embodiment of the disclosure, the cage device is designed as a center cage. In this embodiment, the open ends of the rolling elements, in particular the rollers, are arranged in such a way that they openly protrude out of the center cage.

The rolling elements, in particular the rollers, are particularly only held in the middle, wherein the open ends of the rolling elements, in particular the rollers, are set at a distance to the center cage. The rolling elements may be snapped into the center cage and/or the center cage is designed as a snap cage. The center cage may extend in axial direction over less than 50%, less than 40% of the length of the rolling elements. This embodiment presents the advantage that the cage device can be constructed in a particularly simple manner and that it can thus be kept very cost-efficient.

In a possible further development of the disclosure, the outer ring unit features a circulating guiding groove for the rolling elements. The rolling elements are thus arranged within the outer ring unit, so that the rolling elements and/or the cage device are guided in axial direction by the side walls or the circulating guiding groove.

In an alternative or possible further development of the disclosure, the cam roller comprises at least one securing side ring, such as two securing side rings. It is intended that the securing side ring is arranged within the outer ring unit and that it secures the rolling elements and/or the cage device in axial direction. The outer ring unit e.g. features circulating ring grooves for the securing side ring(s), into which the securing side ring(s) can be placed in a form-fit manner.

A further subject-matter of the disclosure is created by a pod joint for a motor vehicle, wherein the pod joint comprises at least one cam roller, as it was described earlier. The pod joint may be designed as a tripod joint and features three pins and three of the cam rollers. In other design forms it can also be intended that the pod joint comprises only exactly two pins or exactly four pins or more pins and that it carries a corresponding number of such-like cam rollers.

BRIEF DESCRIPTION OF THE DRAWINGS

Further characteristics, advantages and effects of the disclosure can be derived from the following description of preferred embodiments of the disclosure as well as from the attached figures. It is shown.

DETAILED DESCRIPTION

Figure 1:
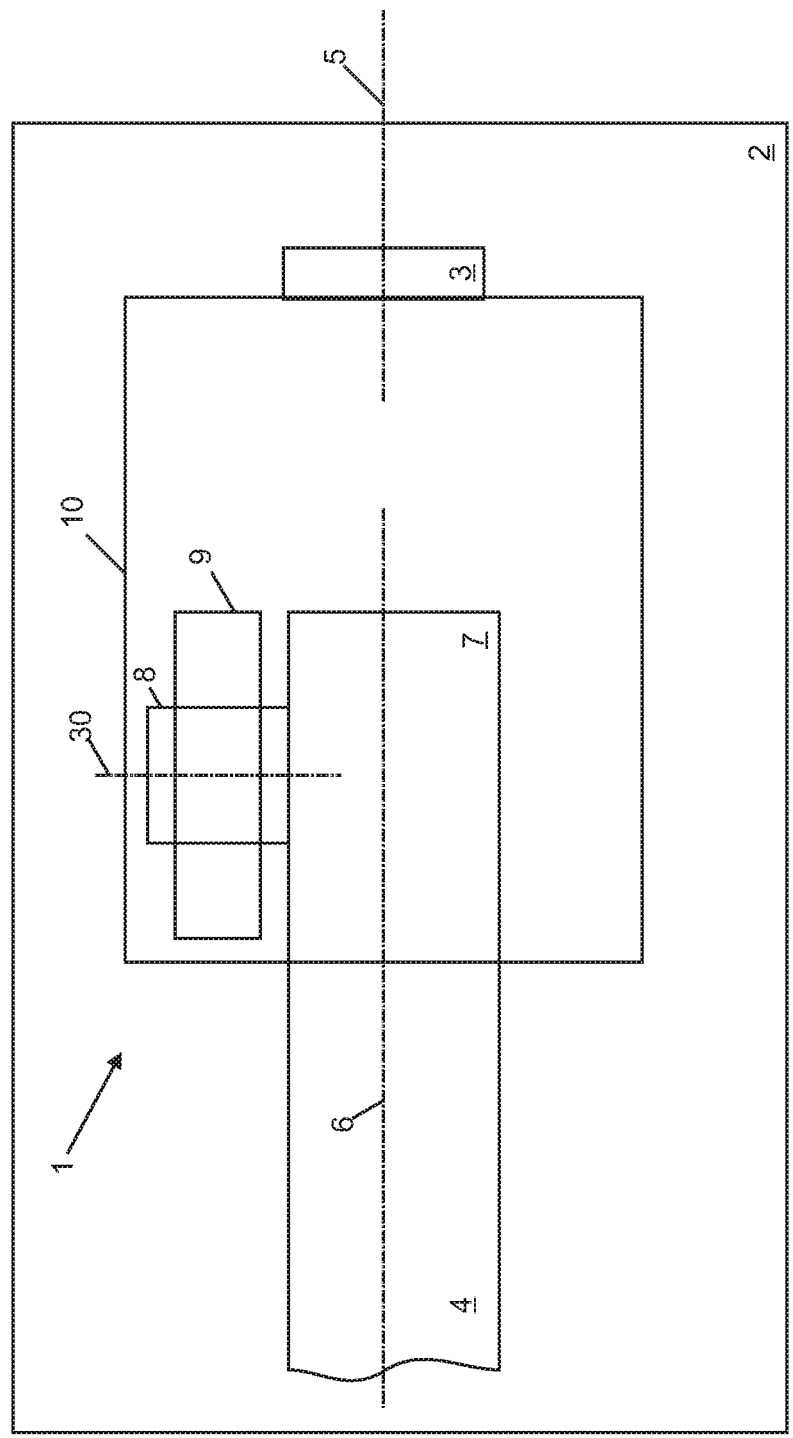
FIG. 1 a highly schematic representation of a pod joint as an embodiment of the disclosure.

FIG. 1 depicts a highly schematic representation of a pod joint 1 for a motor vehicle 2, which is only depicted as a block, as an embodiment of the disclosure.

Pod joint 1 is arranged within the drive train between transmission output 3, in particular a differential transmission, and an intermediate shaft 4, in particular a driving shaft for a wheel or a cardan shaft. Transmission output 3 defines an output shaft 5, the intermediate shaft 4 defines a shaft axis 6. Pod joint 1 is designed to transmit a rotation and thus a drive torque from output 3 to the intermediate shaft 4 and at the same time to enable a tilting or angular adjusting between the output axis 5 and the shaft axis 6, as it can e.g. occur during the deflection of a wheel that is driven and connected to the intermediate shaft 4. The intermediate shaft 4 comprises a shaft stub section 7, onto which a plurality of pins 8, in this embodiment three pins 8, are arranged, which extend in radial direction with reference to the shaft axis 6. Pins 8 are arranged in circumferential direction in regular intervals around shaft axis 6, so that they form a pod star, in this example a tripod star. In FIG. 1, only one of the pins 8 is graphically depicted. On the pins 8, one respective cam roller 9 is arranged, which features a cam roller axis 30 as rotation axis, which is arranged in radial direction with reference to the shaft axis 6.

The pod joint 1 further comprises a bell housing section 10, which is coupled to output 3 in a non-rotatable manner and which provides rolling paths for the cam rollers 9.

While an embodiment is depicted in FIG. 1, in which the bell housing section 10 is coupled to output 3 in a non-rotatable manner and in which the shaft stub section 7 is coupled to the intermediate shaft 4 in a non-rotatable manner, it is also possible in other embodiments that the shaft stub section 7 is coupled to output 3 in a non-rotatable manner and that the bell housing section 10 is coupled to the intermediate shaft 4. It is furthermore possible that the bell housing section 10 is designed in such a way that it is circumferentially enclosed or that it features open sections.

Figure 2B:
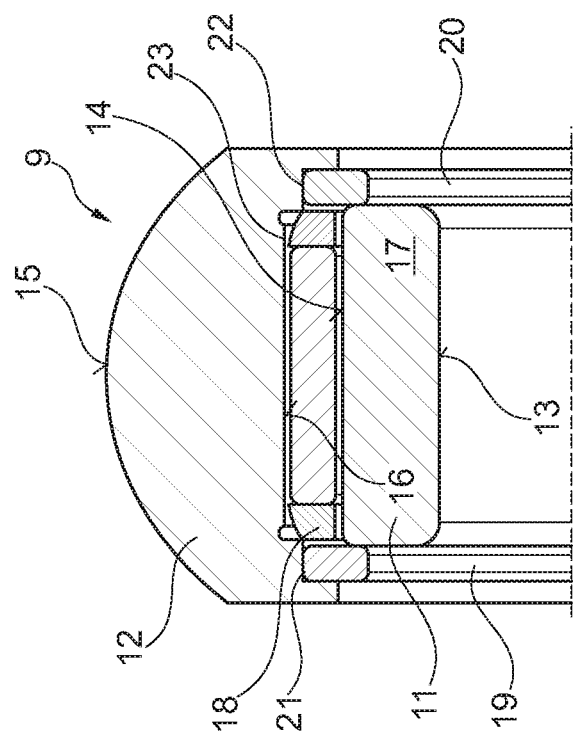
FIGS. 2a, b schematic longitudinal sectional representations of two different embodiments of cam rollers for the pod joint in FIG. 1.
Figure 2A:
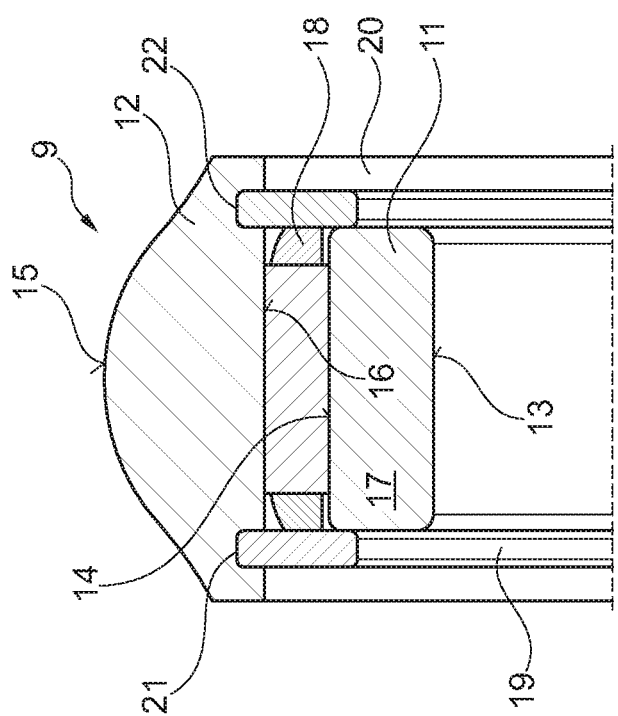

Longitudinal sectional representations of two design forms of the cam roller 9 are depicted in FIGS. 2a, b. The cam rollers 9 comprise one respective inner ring unit 11 as well as one outer ring unit 12, which are arranged coaxially and concentrically with reference to the cam roller axis 30.

The inner ring unit 11 is designed as a single piece and/or one material inner ring and features a hollow cylindrical receiving slot 13 for pin 8 on the radial inner side. On the radial outer side, it provides a cylinder surface as inner rolling path 14.

The outer ring unit 12 is designed in a single piece and/or one material manner and features a rolling path 15 on the radial outer side for the rolling on an inner surface of the bell housing section 10. In the depicted longitudinal sectional representation, the rolling path 15 is designed in a convex manner and in this embodiment in a spherical manner with reference to the rolling path axis 10. On the radial inner side, the outer ring unit 12 carries an outer rolling path 16.

A plurality of rolling elements 17 is arranged between the inner ring unit 11 and the outer ring unit 12. The rolling elements 17 are designed as cylinder rollers and are implemented in both embodiments as needle rollers, wherein their longitudinal extension in axial direction with reference to the rolling path 30 is more than five times as large as the diameter of the rolling elements 17. On the one hand, the rolling elements 17 roll on the inner rolling path 14 and on the other side on the outer rolling path 16. It is thus possible to rotate the inner ring unit 11 in relation to the outer ring unit 12 via the rolling elements 17, wherein the inner ring unit 11 and the outer ring unit 12 roll in opposite direction via the rolling elements 17.

Figure 4:
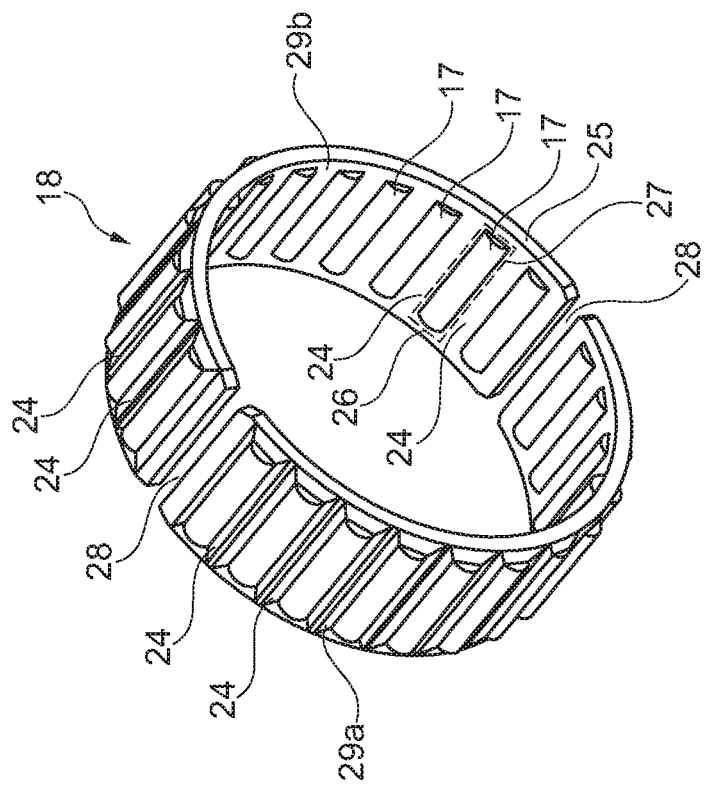
FIGS. 3, 4, 5 in a respective three-dimensional representation, an embodiment of a cage device for the cam rollers in the FIGS. 2a, b or in the pod joint according to FIG. 1.

The rolling elements 17 are arranged within a cage device 18, which will be described in detail later by FIGS. 3, 4 and 5, wherein these Figures depict different embodiments of the cage device 18.

Figure 3:
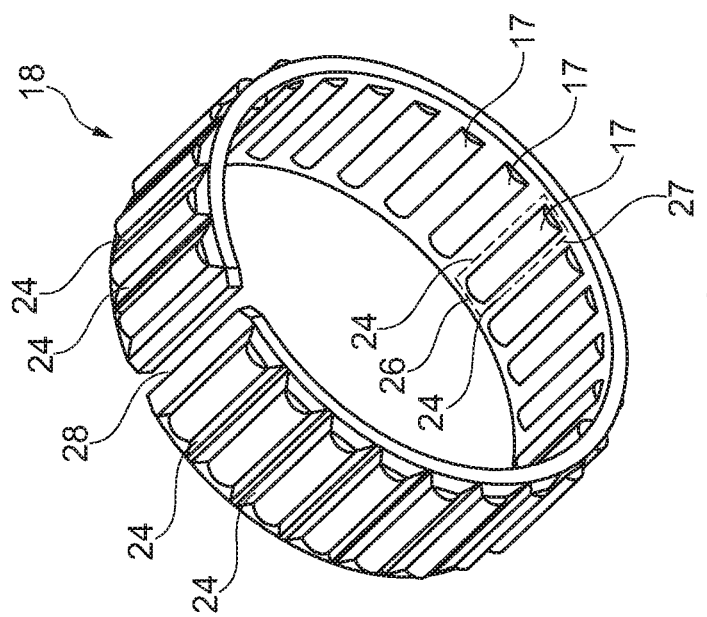

Cam roller 9 furthermore comprises two securing side rings 19, 20, which secure the rolling elements 17 in axial direction, optionally either directly (compare FIG. 5) or indirectly by the cage device 18 (compare FIG. 3, 4). The securing side rings 19, 20 are inserted into circulating ring grooves 21, 22, which are formed into the outer ring unit 12. The side rings 19, 20 extend in radial direction towards the inside to such an extent that they overlap with the inner ring unit 11 in axial direction and thus also secure the inner ring unit 11 against an axial sliding out.

In FIG. 2a, the outer rolling path 16 is formed in a hollow cylindrical manner and extends via an extension all the way until the securing side rings 19, 20. However, in the design form in FIG. 2b, the outer ring unit 12 features a circulating guiding groove 23, which is designed in its axial width in such a way, that the cage device 18 (compare FIG. 3, 4) or the rolling elements 17 (compare FIG. 5) are guided by the side walls of the guiding groove 23.

FIG. 3 depicts a first embodiment of a cage device 18 with inserted rolling elements 17. Cage device 18 is designed as a window cage, wherein a continuous connecting link 24 is formed in axial direction between the respective rolling elements 17, which leads into a circulating ring section 25 or 26, so that each rolling element 17 is arranged within a window 27 that fully encloses the rolling element.

However, cage device 18 is not fully enclosed in circumferential direction around the cam roller axis 10, but it rather features a separating point 28, so that cage device 18 is completely interrupted at one point in circumferential direction.

In the embodiment in FIG. 3 however, the cage device 18 comprises two separating points 28 which are set at an offset of 180 degrees towards each other, so that two cage segments 29a, 29b are formed, which are designed as a respective half shell.

By utilizing the at least one separating point 28, it can be achieved that the assembling of cage device 18 is simplified. Thus, the embodiment of cage device 18 in FIG. 3 can be varied in its open diameter by a bending open or close. Cage device 18 in FIG. 4 can be placed onto the inner ring unit 11 by the two cage segments 29a, b which are designed as two separate half shells.

Figure 5:
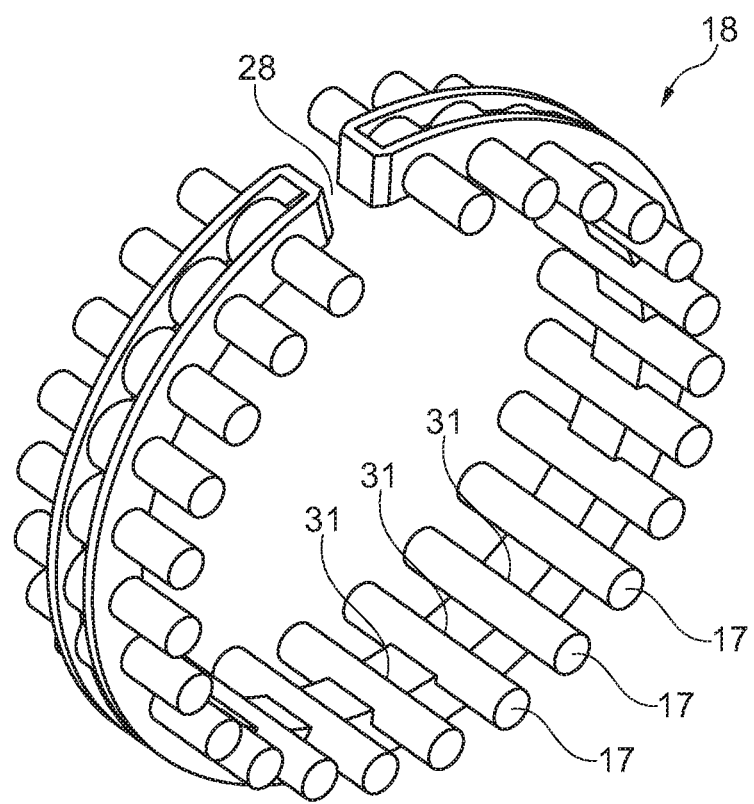

Another design form of cage device 18 is depicted in FIG. 5, wherein this one is implemented as a center cage. In its configuration as a center cage, the rolling elements 17 are only guided in a central area of the center cage, whereas the rolling elements 17 protrude out of cage device 18 on both sides. Rolling elements 17 are inserted and may be clipped into receiving slots 31 of cage device 18, so that these are at least held in a form-fit manner in radial direction with regard to cam roller axis 10. Cage device 18 also features a separating point 28, so that the cage device 18—similar to the one in FIG. 3—can be mounted onto the inner ring unit 11 in a simple manner. For adapted embodiments it is also possible that the center cage is designed as a segment cage and that it features several center cage segments.

LIST OF REFERENCE SIGNS

1 Pod joint
2 Motor vehicle
3 Transmission output
4 Intermediate shaft
5 Output axis
6 Shaft axis
7 Shaft stub section
8 Pin
9 Cam roller
10 Bell housing section
11 Inner ring unit
12 Outer ring unit
13 Hollow cylindrical receiving slot
14 Inner rolling path
15 Rolling path
16 Outer rolling path
17 Rolling element
18 Cage device
19 Securing side ring
20 Securing side ring
21 Ring groove
22 Ring groove
23 Guiding groove
24 Connecting link
25 Ring section
26 Ring section
27 Window
28 Separating point
29a, b Cage segments
30 Cam roller axis
31 Receiving slot

The invention claimed is:

1. A cam roller for a pod joint, comprising:
an inner rolling path;
an outer ring unit, wherein a rolling path configured to allow rolling on a bell housing section is arranged on an outer side of the outer ring unit;
a plurality of rolling elements, wherein the plurality of rolling elements are arranged between the inner rolling path and the outer ring unit;
a cage device, wherein the plurality of rolling elements are arranged within the cage device, wherein the cage device includes at least one separating point in a circumferential direction that does not interlock two sides of the cage device and wherein the rolling elements include end portions that protrude out of the cage device on both sides in the axial direction of the cage device.

2. The cam roller of claim 1, wherein the inner rolling path is formed at an inner ring unit configured to receive a pin of a shaft stub section.

3. The cam roller of claim 1, wherein the cage device features exactly one separating point.

4. The cam roller of claim 3, wherein the cage device is designed as a center cage.

5. The cam roller of claim 4, wherein the outer ring unit comprises a circulating guiding groove for the plurality of rolling elements.

6. The cam roller of claim 5, wherein a securing side ring is arranged within the outer ring unit and secures the plurality of rolling elements in an axial direction.

7. The cam roller of claim 6, wherein the cam roller further includes an inner ring unit formed in a single piece and is configured to carry an outer rolling path for the plurality of rolling elements.

8. The cam roller of claim 1, wherein the cage device is designed as a segment cage and/or features more than one separating point.

9. The cam roller of claim 8, wherein the cage device is designed as a window cage.

10. A cam roller for a pod joint, comprising:
an inner ring device configured to receive a pin of a shaft stub portion;
an outer ring device, wherein a running path for running on a bell housing portion is arranged on an outer side of the outer ring device;
a plurality of rolling bodies arranged between the inner ring device and the outer ring device; and
a cage device that includes rolling bodies and at least one separating point in a circumferential direction, wherein the rolling bodies include end portions that protrude out of the cage device on both sides in the axial direction of the cage device.

11. The cam roller of claim 10, wherein the inner ring device is formed as a single piece and is configured to carry an outer rolling path for the plurality of rolling bodies.

12. The cam roller of claim 10, wherein the outer ring device is formed as a single piece and is configured to carry an inner rolling path for the plurality of rolling bodies.

13. The cam roller of claim 10, wherein the cam roller includes at least one securing side arranged within the outer ring and configured to secure the rolling bodies in an axial direction.

14. The cam roller of claim 10, wherein the pod joint is a tripod joint.

15. The cam roller of claim 10, wherein the cage device includes a continuous connect link formed in an axial direction between respective rolling bodies.

16. The cam roller of claim 15, wherein the cage device includes a window that encloses one of the rolling bodies.

17. A cam roller, comprising:
an inner ring device configured to receive a pin of a shaft stub portion;
an outer ring device, wherein a running path for running on a bell housing portion is arranged on an outer side of the outer ring device;

a plurality of rolling bodies arranged between the inner ring device and the outer ring device; and a cage device that includes rolling bodies and a first separating point in a circumferential direction, wherein the first separating point include a first side and second side facing one another and each substantially parallel from one another and further includes a gap between the first side and second side, wherein at least one of the rolling bodies include a first end and a second end at opposite ends and separated along a length of one of the rolling bodies, wherein the first end and the second end protrude out of the cage device.

18. The cam roller of claim 17, wherein the rolling bodies protrude out of the cage device on a third side of the cage device.

19. The cam roller of claim, 18 wherein the rolling bodies protrude out of the cage device on a fourth side of the cage device.

\* \* \* \* \*